(12) United States Patent
Alkemper et al.

(10) Patent No.: US 11,993,062 B2
(45) Date of Patent: May 28, 2024

(54) COMPOSITE GLASS PANE

(71) Applicant: SCHOTT AG, Mainz (DE)

(72) Inventors: Jochen Alkemper, Klein-Winternheim (DE); Lutz Klippe, Wiesbaden (DE); Rüdiger Dietrich, Jena (DE)

(73) Assignee: SCHOTT AG, Mainz (DE)

( * ) Notice: Subject to any disclaimer, the term of this patent is extended or adjusted under 35 U.S.C. 154(b) by 742 days.

(21) Appl. No.: 16/450,419

(22) Filed: Jun. 24, 2019

(65) Prior Publication Data
US 2019/0308394 A1    Oct. 10, 2019

Related U.S. Application Data

(63) Continuation of application No. PCT/EP2017/081380, filed on Dec. 4, 2017.

(30) Foreign Application Priority Data

Dec. 22, 2016  (DE) .................... 10 2016 125 488.6

(51) Int. Cl.
*B32B 17/10*   (2006.01)
*B32B 3/02*    (2006.01)
(Continued)

(52) U.S. Cl.
CPC ............... *B32B 3/263* (2013.01); *B32B 3/02* (2013.01); *B32B 3/26* (2013.01); *B32B 3/30* (2013.01);
(Continued)

(58) Field of Classification Search
CPC .. B32B 3/263; B32B 3/02; B32B 3/26; B32B 3/30; B32B 17/10036; B32B 17/10045;
(Continued)

(56) References Cited

U.S. PATENT DOCUMENTS 3,843,344 A    10/1974  Galey
3,850,787 A    11/1974  Robinson
(Continued)

FOREIGN PATENT DOCUMENTS

AU    473784    3/1974
AU    4631972   3/1974
(Continued)

OTHER PUBLICATIONS

English translation of International Search Report dated Apr. 6, 2018 for corresponding International Patent Application No. PCT/EP2017/081380, 3 pages.
(Continued)

*Primary Examiner* — Maria V Ewald
*Assistant Examiner* — Ethan Weydemeyer
(74) *Attorney, Agent, or Firm* — Ruggiero McAllister & McMahon LLC

(57) ABSTRACT

A laminated glass pane is provided that includes a first glass sheet, a polymeric layer having a thickness between at least 0.5 mm and at most 1.7 mm, and a second inner glass sheet which has a thickness of at least 0.3 mm and at most 1.5 mm and is made of a lithium aluminum silicate glass. The polymeric layer is disposed between the at least two glass sheets. Furthermore, the glasses of the first and the second glass sheets are matched so that the temperatures at which the two glasses of the first and second glass sheets have the same viscosity in the viscosity range between $10^7$ dPa·s and $10^{10}$ dPa·s differ from each other only by a maximum of 50° C.

21 Claims, 3 Drawing Sheets

(51) Int. Cl.

| | | |
|---|---|---|
| *B32B 3/26* | (2006.01) | |
| *B32B 3/30* | (2006.01) | |
| *C03B 17/06* | (2006.01) | |
| *C03B 18/02* | (2006.01) | |
| *C03B 23/023* | (2006.01) | |
| *C03C 3/083* | (2006.01) | |
| *C03C 3/087* | (2006.01) | |
| *C03C 3/093* | (2006.01) | |
| *C03C 21/00* | (2006.01) | |

(52) U.S. Cl.
CPC .. *B32B 17/10036* (2013.01); *B32B 17/10045* (2013.01); *B32B 17/10119* (2013.01); *B32B 17/10137* (2013.01); *C03B 17/064* (2013.01); *C03B 18/02* (2013.01); *C03B 23/023* (2013.01); *C03C 3/083* (2013.01); *C03C 3/087* (2013.01); *C03C 3/093* (2013.01); *C03C 21/002* (2013.01); *B32B 2315/08* (2013.01); *B32B 2329/04* (2013.01); *B32B 2329/06* (2013.01); *B32B 2551/00* (2013.01); *B32B 2571/00* (2013.01); *B32B 2605/006* (2013.01); *Y10T 428/24777* (2015.01)

(58) Field of Classification Search
CPC ......... B32B 17/10119; B32B 17/10137; B32B 2315/08; B32B 2329/04; B32B 2329/06; B32B 2251/00; B32B 2571/00; B32B 2605/006; C03B 17/064; C03B 18/02; C03B 23/023; C03B 3/083; C03B 3/087; C03B 3/093; C03B 21/002
See application file for complete search history.

(56) References Cited

U.S. PATENT DOCUMENTS

| | | |
|---|---|---|
| 3,961,930 A | 6/1976 | Robinson |
| 4,138,239 A | 2/1979 | Nier |
| 4,197,107 A | 4/1980 | Kunkle |
| 5,876,472 A | 3/1999 | Gros |
| 2005/0000248 A1 | 1/2005 | Lauten-Schlaeger |
| 2005/0101469 A1 | 5/2005 | Peuchert |
| 2006/0110603 A1 | 5/2006 | Langsdorf |
| 2007/0243992 A1 | 10/2007 | Fechner |
| 2011/0001902 A1 | 1/2011 | Ikadai |
| 2012/0094084 A1 | 4/2012 | Fisher |
| 2013/0189486 A1 | 7/2013 | Wang |
| 2014/0120335 A1 | 5/2014 | Yamanaka |
| 2014/0305502 A1 | 10/2014 | Sasai |
| 2015/0140301 A1 | 5/2015 | Fisher |
| 2015/0251377 A1 | 9/2015 | Cleary |
| 2015/0314571 A1 | 11/2015 | Cites |
| 2016/0068423 A1 | 3/2016 | Tanaka |
| 2016/0176746 A1 | 6/2016 | Hunzinger |
| 2016/0194242 A1 | 7/2016 | Tanaka |
| 2016/0257094 A1 | 9/2016 | Lestringant |
| 2016/0279904 A1 | 9/2016 | Sienerth |
| 2017/0052311 A1 | 2/2017 | Lautenschlaeger |
| 2017/0113520 A1 | 4/2017 | Sienerth |
| 2017/0334759 A1 | 11/2017 | Yamato |
| 2018/0151408 A1 | 5/2018 | Hanawa |
| 2018/0339929 A1 | 11/2018 | Katayama |
| 2019/0308394 A1 | 10/2019 | Alkemper |
| 2019/0352209 A1 | 11/2019 | Iga |

FOREIGN PATENT DOCUMENTS

| | | |
|---|---|---|
| CN | 1525945 | 9/2004 |
| CN | 102219356 | 10/2011 |
| CN | 104692627 | 6/2015 |
| CN | 105307989 | 2/2016 |
| CN | 105621863 | 6/2016 |
| DE | 1919819 | 11/1969 |
| DE | 1555014 | 6/1970 |
| DE | 2309445 | 10/1974 |
| DE | 102006051637 | 5/2008 |
| DE | 102013203624 | 9/2014 |
| EP | 3144141 | 3/2017 |
| GB | 1143468 | 2/1969 |
| GB | 1253284 | 11/1971 |
| JP | H0710569 | 1/1995 |
| JP | H0753223 | 2/1995 |
| JP | 2004131314 | 4/2004 |
| JP | 2005510440 | 4/2005 |
| JP | 2013520385 | 6/2013 |
| JP | 2015098424 | 5/2015 |
| JP | 2015105216 | 6/2015 |
| JP | 2016008161 | 1/2016 |
| JP | 2016153344 | 8/2016 |
| JP | 2016523788 | 8/2016 |
| JP | 2016183054 | 10/2016 |
| JP | 2016216323 | 12/2016 |
| JP | 2017052687 | 3/2017 |
| JP | 2020514219 | 5/2020 |
| KR | 20150063947 | 6/2015 |
| KR | 20160021762 | 2/2016 |
| WO | 2012051038 | 4/2012 |
| WO | 2013145922 | 10/2013 |
| WO | 2013183449 | 12/2013 |
| WO | 2014052229 | 4/2014 |
| WO | 2014185127 | 11/2014 |
| WO | 2014209861 | 12/2014 |
| WO | 2015006201 | 1/2015 |
| WO | 2015058885 | 4/2015 |
| WO | 2015059407 | 4/2015 |
| WO | 2015084902 | 6/2015 |
| WO | 2015158464 | 10/2015 |
| WO | 2015168259 | 11/2015 |
| WO | 2016007812 | 1/2016 |
| WO | 2016048815 | 3/2016 |
| WO | 2016117650 | 7/2016 |
| WO | 2016136348 | 9/2016 |
| WO | 2016196546 | 12/2016 |
| WO | 2017183381 A1 | 10/2017 |

OTHER PUBLICATIONS

English translation of International Preliminary Report on Patentability dated Jun. 27, 2019 for corresponding International Patent Application No. PCT/EP2017/081380, 8 pages.
Din En 1288-5, "Determination of the bending strength of glass—Part 5: Coaxial double ring test on flat specimens with small test surface areas", Sep. 2000, 16 pages.
DIN 52305, "Determining the optical distortion and refractive power of safety glazing material for road vehicles", Jun. 1995, 9 pages.
JIS B 0601:2013 (ISO 4287 : 1997, Amd. 1 : 2009) (JSA) "Geometrical Product Specifications (GPS)—Surface texture: Profile method—Terms, definitions and surface texture parameters", Mar. 21, 2013, 32 Pages.
JIS B 0651:2001 (ISO 3274 : 1996), (JSA) "Geometrical Product Specifications (GPS}—Surface texture: Profile method—Nominal characteristics of contact (stylus) instruments", Jan. 20, 2001, 4 Pages.

COMPOSITE GLASS PANE

CROSS REFERENCE TO RELATED APPLICATIONS

This application is a continuation of International Application No. PCT/EP2017/081380 filed Dec. 4, 2017, which claims benefit under 35 USC 119(a) of German Application No. 10 216 125 488.6 filed Dec. 22, 2016, the entire contents of all of which are incorporated herein by reference.

BACKGROUND

1. Field of the Invention

The invention relates to laminated safety glasses and to glasses which are suitable for use in a laminated safety glass.

2. Description of Related Art

Laminated safety glasses have been state of the art for many years and are known to be a composite of at least two glass sheets with a film disposed therebetween. In the case of an impact of an external force on the laminated pane, the special structure of laminated safety glass ensures that, although individual or all glass sheets may break, the laminated pane will resist the external force in such a way that no item will pass through and in some applications even any resulting glass fragments will remain attached to the foil. In this case, the risk of injury to persons behind the pane caused by flying glass fragments is low. There are also laminated safety glasses in automobiles which are able to resiliently withstand a force that is exerted from the passenger compartment side, for example. This will in particular be necessary when the airbag ignites, for example, or if the pane should prevent people from being thrown out of the vehicle. In both cases, the laminated safety glass provides resilient resistance. In the case of an impact of persons from inside against the laminated safety glass pane, its resilient resistance will prevent the impact from posing a greater risk to the passenger than being thrown out. Compared to prior art glass panes, laminated safety glass increases the resistance to violent impact and reduces the risk of injury in the case of glass breakage.

The exact structure may vary depending on the intended use.

For example, German patent application publication DE 1 555 014 describes a multi-layer automotive glazing such as a windshield. The glass sheet facing the interior of the vehicle features compressive stress in its surface layer and has a thickness not greater than that of the outer glass sheet. Inner and outer glass sheets are separated by a translucent plastic interlayer made of polyvinyl butyral (PVB). Due to the compressive stress in its surface layer, the inner glass sheet has a greater ability to flex and a greater resistance to fracture than the outer glass sheet if an item impacts the glazing from outside. Patent application publication DE 1 555 014 furthermore describes that such compressive stress may be created by chemical toughening.

Here, outer glass sheet refers to a glass sheet which, when used as intended, that is for example as a windshield of an automobile or in similar applications in the present case, is arranged on the outside, i.e. outside the passenger compartment. An inner glass sheet faces the passenger compartment when used as intended.

International patent application WO 2014/052229 A1 describes a laminate comprising a first thin glass which is chemically toughened and which has a compressive stress between 250 MPa and 350 MPa and a thickness of the compressive stress layer of more than 60 µm, a second glass and at least one polymer layer arranged between the two glass sheets. Furthermore, a method for chemical toughening is described, which allows to obtained a glass as described above.

International patent application WO 2015/006201 A1 describes a laminate in which a first outer glass sheet is not chemically toughened, whereas a second, inner glass sheet has been chemically toughened. The inner glass sheet that has been chemically toughened has a thickness between 0.5 mm and 1.5 mm. The outer glass sheet has a greater thickness between 1.5 mm and 3.0 mm.

International patent application WO 2014/209861 A1 likewise describes a laminate which comprises two glass layers and a polymer interlayer disposed therebetween. One of the glass sheets is made of a thin glass that has been chemically toughened and features a compressive stress between 250 MPa and 350 MPa and a thickness of the compressive stress layer of more than 60 µm.

A glass laminate comprising a polymer interlayer that is applied to a first surface of a chemically toughened glass sheet is described in international patent application WO 2012/051038 A1. The first glass sheet has a thickness of less than 2 mm and a near-surface layer under a compressive stress of more than 300 MPa. This near-surface compressive stress layer has a thickness of at least 65-0.06*CS, where CS represents the value of compressive stress in the near-surface layer. Both glass sheets of the laminate have approximately the same thickness.

International patent application WO 2015/059407 A1 discloses a glass laminate comprising an outer glass sheet with a maximum thickness of 1.5 mm and with a different chemical composition than that of an inner glass sheet. Due to the different chemical composition of the inner and outer glass sheets, there is a divergence in the viscosity versus temperature profile for the two glass sheets, while the viscosities of the inner and outer glass sheets are matched to one another.

International patent application WO 2015/058885 A1 again discloses a laminated glass. This glass comprises at least one chemically toughened glass sheet with a thickness of less than or equal to 2.1 mm and an intermediate layer. The intermediate layer is in the form of comprising a thermoplastic bonding layer and a thermoplastic carrier layer, and the thermoplastic carrier layer in turn has a functional coating or functional inclusions.

U.S. patent application US 2015/0251377 A1 describes a glass laminate comprising a non-toughened outer glass sheet with a thickness ranging between 1.5 mm and 3 mm, and a chemically toughened inner glass sheet with a thickness ranging between 0.3 mm and 1.5 mm, and a wedge-shaped polymeric interlayer.

International patent application WO 2015/158464 A1 describes an automotive laminated glass comprising an inner glass sheet which has a thickness between 0.1 mm and 0.4 mm, and an outer glass sheet of a thickness between 1.0 mm and 1.8 mm. The thickness of the inner glass sheet is not more than 25% of the thickness of the outer glass sheet.

Furthermore, international patent application WO 2015/168529 A1 describes a laminate in which at least one of the two glass sheets is made of an aluminosilicate glass of a specific composition. Such glasses can be toughened by exchanging Na by K, for example. If this is done in one process step, high CS values and low DoL values are achieved, and this is the case in the examples of the international application considered here. Actually, this is only beneficial for limited applications. Here, CS refers to 'compressive stress'. DoL is the abbreviation for 'Depth of Layer' which indicates the thickness of the compressive stress zone. In the context of the present invention, the terms 'CS' and 'compressive stress' are used synonymously, as well as the terms 'Depth of Layer', 'DoL', and compressive stress zone (or thickness of the compressive stress zone).

Finally, Japanese patent application JP 2016/008161 A describes a glass laminate comprising a first outer glass sheet having a thickness of at most 2 mm and being provided as a chemically toughened aluminosilicate glass of specific composition. With all mentioned compositions, a Young's modulus of not more than 73 GPa is achieved, and, when chemically toughened using $KNO_3$, high CS values and a rather low DoL is obtained.

SUMMARY

All the aforementioned laminated glass panes are based on the central task, on the one hand, to ensure in the case of glass breakage, for example due to a mechanical impact, that the glass preferably fractures in such a manner that injuries are largely prevented, and on the other hand to have the ability to largely absorb the force of an impact of blunt bodies resiliently. At the same time, especially in the field of automotive glazing, the reduction of the weight of such laminated glass panes is increasingly being addressed. However, this goal must not be at the expense of the required mechanical properties. Moreover, it has to be considered that for example windshields for automotive applications generally have a curved shape. This means that the individual glass sheets of such a laminated glass pane have to be matched the best possible in terms of shape in order to enable lamination. An optimum adaptation of the two shapes of the glass sheets to one another would result if, for example, the two glass sheets would be shaped at the same time or at least under the same conditions, in particular also by the same manufacturing units. However, this is usually not possible due to significantly different viscosity characteristics of the employed glasses that are known from the prior art. In the few cases in which glasses are selected which can be shaped simultaneously, this implies drawbacks in stiffness and in the parameters CS and DoL, and/or requires a complex and costly, mostly multi-step process of solidification.

Another drawback is that very high temperatures are necessary for the thermal shaping, especially in the case of the aluminosilicate glasses which are most frequently used in the prior art as glasses that can be toughened chemically. If these glasses are then strongly chemically toughened in conventional manner, using $KNO_3$, in order to achieve high scratch resistance at the surface, a very finely crumbled fracture pattern will readily be caused in the event of impacts of small pointed bodies (such as road gravel). In the event of fracturing, this finely crumbled fracture pattern will strongly impede the view in the vehicle outside, and moreover increases the risk that small splinters might detach with the result of an increased risk of injury to vehicle passengers. What is furthermore desirable for a high torsional rigidity of such a glass laminate for automobile glazing is a higher modulus of elasticity of the glass than can be provided by aluminosilicate glasses.

Therefore, there is a need for the provision of a laminated glass pane which is easily produced and which features high torsional rigidity, a highly strengthened surface, which is able to resiliently absorb forces exerted by impacting items, and at the same time ensures a good view outside, even in a damaged state.

The object of the invention is to provide a laminated glass pane which comprises a glass that allows to easily produce the laminated glass pane with the desired properties.

The laminated glass pane according to the invention comprises a first glass sheet.

Here, composite or laminated glass or laminated glass pane refers to a structure which comprises at least two layers, for example two glass layers which are connected to one another such that a layered body is resulting, in particular a body comprising at least three layers. In the context of the present invention this means in particular that the composition of the body varies in the direction of its thickness, usually with a sudden change in the physical and chemical properties occurring at the interfaces where the individual layers abut each other. In the context of the present invention, such a layered body, for example a three-layer body, is also referred to as a laminate. So the composite glass pane can be referred to as a glass laminate or laminate as well.

For the purposes of the present invention, a sheet or pane is understood to mean a shaped body which has an extent in one spatial direction that is at least one order of magnitude smaller than in the other two spatial directions. As a synonym for the term 'sheet', such shaped bodies are also referred to as panels, or, if the extent is particularly large in one spatial direction, as ribbons. The one spatial direction in which the extent of the sheet-like body is at least one order of magnitude smaller than in the two other spatial directions is also referred to as thickness in the context of the present invention.

Furthermore, the laminated glass pane according to the invention comprises a polymeric layer.

Polymer refers to a substance which comprises so-called macromolecules, in particular organic macromolecules. By way of example, such a substance may be a plastic, that is to say it may comprise further constituents such as additives, in addition to organic macromolecules.

The polymeric layer of the present invention may be provided in the form of one or more film layers, for example. However, it is also possible that the polymeric layer is formed in situ on one of the two glass sheets. For example, it is possible to apply monomers onto a glass sheet, which polymerize by crosslinking reactions. In this way it is possible to selectively adjust the properties of the polymeric layer depending on the exact reaction conditions.

The polymeric layer preferably comprises a thermoplastic material, i.e. a plastic that becomes plastically reshapeable upon temperature increase in a particular temperature range, and this process is reversible, i.e. when lowering the temperature below a softening temperature which depends on the exact type of the respective plastic, the plastic gets solid again. If the polymeric layer comprises a plurality of film layers, then this structure may have different properties. For example, a multi-layer structure may serve for noise insulation. A single- or multi-layer structure may absorb or reflect on its surface particular radiation components of the sunlight passing through the laminate composite. So, the functionality of the polymeric layer is not limited to the achievement of mechanical properties of the laminate composite (safety glass function), but may additionally include optical and/or sound-absorbing properties as well.

Most preferably, the plastic comprises polyvinyl butyral (PVB) or ethylene vinyl acetate (EVA). Furthermore or alternatively, the plastic may also comprise PET or PE.

The polymeric layer has a thickness ranging between at least 0.5 mm and at most 1.7 mm.

Furthermore, the laminated glass pane according to the present invention comprises a second glass sheet which has a thickness between at least 0.3 mm and at most 1.5 mm and comprises a lithium aluminum silicate glass.

The polymeric layer is disposed between the first and second glass sheets and bonds the two glass sheets together.

The glass compositions of the first and second glass sheets are matched so that the temperatures at which the two glasses of the first and second glass sheets have the same viscosity in the viscosity range between $10^7$ dPa·s and $10^{10}$ dPa·s only differ from each other by not more than 50° C., preferably by not more than 30° C., more preferably by not more than 20° C., and most preferably by not more than 10° C.

So, the small difference in temperatures for the temperatures at which the considered glass sheets have the same viscosity is significant. For example, the temperature at which the viscosity of the two sheets has a value of $10^{7.6}$ dPa·s, is about 880° C. for the second glass sheet. Then, the temperature at which the first glass sheet has a viscosity of $10^{7.6}$ dPa·s is at least 830° C. and at most 930° C. here, preferably at least 850° C. and at most 910° C., more preferably at least 860° C. and at most 900° C., and most preferably at least 870° C. and at most 890° C.

The viscosity range addressed here is the range at which a glass can be reshaped or may deform, for example under the influence of gravity. By matching the glass compositions of the first and second glass sheets such that their temperatures at the same viscosity differ from each other only by a small amount in the viscosity range considered here, it is possible to reshape both sheets at the same time, for example, or if not at the same time to reshape them using the same equipment conditions, for example, using the same manufacturing units.

Such a laminated glass pane can therefore be manufactured substantially more cost-efficiently compared to the manufacture of prior art laminated glass panes. Furthermore, the use of a lithium aluminum silicate glass for the second glass sheet ensures that a glass with high transmittance in the optical wavelength range is used. So, first, the laminated glass pane according to the invention ensures very good transmittance, which also means very good view through the glass sheet. Second, since a very thin second glass sheet is used, the weight of the resulting laminated glass pane is kept low. Finally, the possibility of reshaping both the second and the first glass sheet on the same manufacturing unit, for example even in the same step, moreover provides for a considerably more cost-effective manufacture of the laminated glass pane in comparison with the prior art laminated glass panes.

According to one embodiment of the invention, the lithium aluminum silicate glass has a Young's modulus of at least 80 GPa, preferably at least 82 GPa, more preferably at least 84 GPa. A high Young's modulus implies higher stiffness of the glass sheet, which is particularly indicated when thinner glass sheets are used, since torsional rigidity decreases with smaller thickness. An upper limit for the Young's modulus of glasses can be assumed at about 95 GPa.

According to one embodiment of the invention, the second glass sheet is provided as a chemically toughened glass sheet. Such chemically toughened state may be achieved by a process in which a glass sheet is immersed in a molten salt, e.g. a melt of potassium nitrate and/or sodium nitrate, at a temperature below the transformation temperature $T_g$ of the glass. Depending on the exact composition, such a process includes a replacement of the alkali ions contained in the glass by ions of the molten salt, for example the exchange of lithium and/or sodium ions from the glass by potassium and/or sodium ions from the molten salt. In this way, near-surface compressive stresses are generated at the surface of the glass sheet. The term 'compressive stress' is often abbreviated CS, for short. Furthermore, the depth of the surface compressive stress zone has to be considered, also known as 'depth of layer' or 'DoL', for short. In this compressive stress zone, lithium ions have been replaced by other alkali ions, at least partially.

According to a preferred embodiment of the invention, the second glass sheet is provided in the form of a chemically toughened sheet, and the compressive stress zone has a depth of at least 40 μm thickness and the compressive stress is at least 150 MPa and at most 900 MPa.

According to a further embodiment of the invention, the compressive stress is at most 800 MPa, preferably at most 600 MPa. Such a compressive stress is in particular achieved by toughening using a sodium nitrate-potassium nitrate mixture.

According to a further embodiment of the invention, the compressive stress is at most 500 MPa, preferably at most 400 MPa, more preferably at most 300 MPa, and most preferably at most 250 MPa. Such compressive stresses can be achieved in particular by toughening using a pure sodium nitrate melt.

Here, the nature of the respective toughening process can usually be identified based on a variation in the composition of the considered glass, i.e. the glass sheet in question, for example, on the surface of the glass, i.e. the glass sheet, for example. For example, if the toughening has been accomplished by immersion into a sodium salt melt, such as a sodium nitrate melt, sodium will be enriched in the surface of the glass, whereas the surface layer will be depleted of lithium which has been exchanged by sodium. This depletion and enrichment can be shown by ToF-SIMS surface profiles, for example.

If the toughening is performed in a salt melt which comprises a mixture of potassium and sodium salts, then the surface of the glass will in particular become enriched in potassium, which can also be detected by ToF-SIMS. Furthermore, a depletion in lithium will occur.

According to a further embodiment of the invention, the compressive stress zone has a depth of at least 50 μm, preferably of at least 60 μm, more preferably of at least 70 μm, and most preferably of at least 80 μm. Such a thickness of the compressive stress or ion exchange zone is preferably obtained by exchanging lithium by sodium.

According to a further embodiment of the invention, the second glass sheet is configured such that the compressive stress zone has a depth of at least 40 μm thickness, preferably at least 50 μm thickness, more preferably at least 60 μm thickness, yet more preferably at least 70 μm thickness, and most preferably at least 80 μm thickness, and, preferably, the surfaces of the second glass sheet are enriched in sodium and depleted of lithium in the region of the compressive stress zone (or ion exchange zone) compared to the interior of the sheet which is also referred to as 'bulk'. Such a configuration of the glass sheet can be achieved, for example, by an exchange in which the salt bath (the molten salt) comprises sodium nitrate, in particular solely consists of sodium nitrate, so that the compressive stress zone (or ion exchange zone) is obtained by replacing lithium by sodium.

Here, 'bulk' of the glass refers to the region of the glass remote from an interface, that is to say where interface and/or surface effects which may include a variation in the composition and/or in physical properties and/or of bonding conditions between the individual constituents of the glass remain out of consideration, and where the composition substantially corresponds to the composition determined in an analysis of the glass.

According to a further preferred embodiment of the invention, the compressive stress at the surface is at most 550 MPa. In this case, the compressive stress zone has a depth of at least 40 µm thickness, preferably at least 50 µm thickness, more preferably at least 60 µm thickness, yet more preferably at least 70 µm thickness, and most preferably at least 80 µm thickness. Preferably, the surfaces of the second glass sheet are enriched in sodium and depleted of lithium in the region of the compressive stress zone, compared to the bulk of the glass sheet.

According to a further embodiment of the invention, the laminated glass pane is curved such that the outwardly facing side of the second glass sheet is curved concavely.

According to yet another embodiment of the invention, the laminated glass pane has a uniaxially deformed shape.

In the context of the present invention, a glass sheet is referred to as being uniaxially curved when the glass sheet is curved in only one direction, for example. A glass sheet is referred to as being biaxially curved when the glass sheet is curved in two directions, for example in the form of a shell or a dome-like shape.

According to yet another embodiment of the invention, the laminated glass pane has a biaxially deformed shape.

According to yet another embodiment of the invention, at least the second glass sheet is formed in a melting process followed by a hot forming process. The hot forming process comprises a drawing process, for example a so-called up-draw process, a down-draw process, or an overflow-fusion process, or a float process. According to a preferred embodiment of the invention, the second glass sheet is a float glass sheet.

Preferably, the second glass sheet is formed such that it features only slight optical distortion. Optical distortion of a glass sheet is a result of varying thickness across the width of the glass sheet, for example caused by the drawing process, for example due to slight contamination at the drawing slit or when the glass sheet is removed from the tin bath. The optical distortion of a glass sheet is determined, for example, using a so-called 'zebra board'. Such a test procedure is described in DIN EN 572-2, by way of example. An illuminated screen with a grid of black and white stripes ('zebra') is viewed through the glass to be tested. Then, the angle between the glass sheet and the board is slowly altered, from the initial state with an angle α of 90° (glass sheet perpendicular to the screen) towards α=0° (glass sheet parallel to the screen) until the stripes are no longer distorted due to the glass. Preferably, this angle which is also referred to as 'zebra angle' is greater than or equal to 45° for the second glass sheet. Thus, the second glass sheet preferably has a zebra angle greater than or equal to 45°, more preferably greater than or equal to 50°, most preferably greater than or equal to 55°, at a thickness of 0.7 mm.

According to one embodiment of the invention, the second glass sheet exhibits a so-called ring-on-ring bending strength of more than 150 MPa, in particular more than 250 MPa, preferably more than 300 MPa, yet more preferably more than 400 MPa, yet more preferably more than 500 MPa, and most preferably more than 600 MPa and less than 900 MPa. Bending strength is a parameter which, like the strength of glass in general, is determined by the strength of the bonds between the glass constituents and may have a maximum value of about 29 GPa according to theoretical calculations. In practice, these values are significantly lower, which is attributed to cracks distributed throughout the glass, according to the so-called crack theory. The ring-on-ring procedure for determining the bending strength is described in DIN EN 1288-5. For the glasses considered here, the procedure described in the aforementioned standard has been modified. Here, a ring with a diameter of 3 mm and a second ring with a diameter of 15 mm are used. The large ring is the ring on which the sample rests, whose bending strength is to be determined, the smaller ring rests on the upward facing side of the sample and is pressed down.

According to another preferred embodiment of the invention, the second glass sheet has a combined toughened zone which comprises a potassium-exchanged surface layer with a thickness of less than 20 µm as determined from the glass surface, with a maximum compressive stress at the surface of more than 500 MPa, preferably more than 600 MPa; and a sodium-exchanged surface layer with a thickness of more than 40 µm, preferably more than 50 µm, more preferably more than 60 µm, yet more preferably more than 70 µm, and most preferably more than 80 µm as determined from the glass surface, wherein the maximum local stress in the interior of the purely sodium-exchanged surface layer is less than 500 MPa, preferably less than 400 MPa.

As to the purely sodium-exchanged surface layer, this refers to the layer in which only sodium has been exchanged. This layer is located towards the center of the glass seen from the surface of the glass, i.e. below the layer in which the combined exchange to potassium and sodium has occurred.

The maximum stress in the potassium-exchanged surface layer is at most 900 MPa. The maximum stress in the sodium-exchanged surface layer may be at least 50 MPa.

This means that in the surface layer of the second glass sheet, i.e. to a thickness of less than 20 µm (so-called potassium exchange zone), potassium ions have been exchanged for sodium ions and for lithium ions to a lesser extent. Furthermore, the glass sheet comprises a sodium-exchanged surface layer (so-called sodium exchange zone), which at least partially overlaps the potassium-exchanged surface with regard to its extent in the glass. This sodium-exchanged surface layer has a thickness of more than 40 µm, in particular more than 50 µm, preferably more than 60 µm, particularly preferably more than 70 µm, and most preferably more than 80 µm. Here, the alkali ions such as lithium ions have been at least partially replaced by sodium ions.

According to yet another embodiment of the invention, the first glass sheet comprises a soda-lime glass with a thickness between 1.5 mm and 2.5 mm or a lithium aluminum silicate glass with a thickness between at least 0.3 mm and at most 1.5 mm.

Furthermore it is possible that, for example if the laminated glass pane according to an embodiment of the invention is used as a glazing for a passenger compartment, for example in an automobile, the second glass sheet faces inwards, i.e. toward the passenger compartment. However, it is furthermore also possible that the second glass sheet faces outward and the first glass sheet is arranged to face inward, that is toward the passenger compartment.

Generally, the first glass sheet may comprise a soda-lime glass, and the second glass sheet may be provided in chemically toughened form, wherein the second glass sheet has a thickness of the ion-exchanged layer of more than 65 µm, preferably more than 80 µm. Such a thickness of the ion-exchanged layer may be produced by an ion exchange process using either pure sodium nitrate or a mixture of sodium nitrate and potassium nitrate, or in a two-step process in which the ion exchange is first performed using pure sodium nitrate and then with pure potassium nitrate.

If the first glass sheet comprises a lithium aluminum silicate glass, this may be designed so as to have substantially the same composition as the second glass sheet. However, compositions differing from the composition of the second glass sheet are, of course, possible as well.

In the sense of the present invention, different glasses or glass sheets are referred to as having substantially the same composition if the compositions only have slight differences in the composition. For example, two glass sheets have the same composition in the sense of the present invention, if the compositions differ only due to unavoidable manufacturing variations due to technical reasons. Such differences are usually present when the contents of the individual constituents differ from each other by no more than 0.2 percentage points, that is, for example, when one glass sheet has a content of $SiO_2$ of 75 wt % and the other glass sheet has a content of $SiO_2$ between 74.8 wt % and 75.2 wt %.

According to a further embodiment, it is in particular possible that the first glass sheet comprises a soda-lime glass. In this case, the first glass sheet may be disposed inside when used for automotive glazing. However, it is also possible that the first glass sheet comprises a soda-lime glass and is arranged outside.

The soda-lime glass is in particular provided as a glass that is not chemically toughened.

If the second glass sheet is designed so as to feature high compressive stress and at the same time has a large thickness of the compressive stress zone, then it is preferably arranged outside when used for automotive glazing.

According to a preferred embodiment of the invention, the second glass sheet comprises a lithium aluminum silicate glass having a $Li_2O$ content from 4.6 wt % to 5.4 wt % and an $Na_2O$ content from 8.1 wt %. to 9.7 wt % and an $Al_2O_3$ content from 16 wt % to 20 wt %.

According to yet another embodiment of the invention, the first glass sheet comprises a lithium aluminum silicate glass having a $Li_2O$ content from 4.6 wt % to 5.4 wt % and a $Na_2O$ content from 8.1 wt %. % to 9.7 wt % and an $Al_2O_3$ content from 16 wt % to 20 wt %.

According to a further preferred embodiment of the invention, the second glass sheet comprises the following constituents:

| | |
|---|---|
| 58 to 65 wt % | $SiO_2$ |
| 16 to 20 wt % | $Al_2O_3$ |
| 0.1 to 1 wt % | $B_2O_3$ |
| 4.6 to 5.4 wt % | $Li_2O$ |
| 8.1 to 9.7 wt % | $Na_2O$ |
| optionally 0.05 to 1.0 wt % | $K_2O$ |
| 0.2 to 2.0 wt % | CaO |
| 2.5 to 5.0 wt % | $ZrO_2$. |

Optionally, one or more of the constituents $SnO_2$, $CeO_2$, $P_2O_5$, and ZnO may be included, with a content of 0 wt % to 2.5 wt % in total.

A further preferred composition range for the second glass sheet comprises:

| | |
|---|---|
| 60 to 62 wt % | $SiO_2$ |
| 17.5 to 19.5 wt % | $Al_2O_3$ |
| 0.5 to 0.7 wt % | $B_2O_3$ |
| 4.8 to 5.2 wt % | $Li_2O$ |
| 8.5 to 9.5 wt % | $Na_2O$ |
| 0.2 to 0.5 wt % | $K_2O$ |
| 0.5 to 1.2 wt % | CaO |
| 3.2 to 3.8 wt % | $ZrO_2$. |

Optionally, one or more of the constituents $SnO_2$, $CeO_2$, $P_2O_5$, and ZnO may be included, with a content of 0.25 wt % to 1.6 wt % in total.

Yet another preferred composition range for the second glass sheet comprises:

| | |
|---|---|
| 61 to 62 wt % | $SiO_2$ |
| 17.5 to 18.5 wt % | $Al_2O_3$ |
| 0.5 to 0.7 wt % | $B_2O_3$ |
| 4.9 to 5.1 wt % | $Li_2O$ |
| 8.8 to 9.3 wt % | $Na_2O$ |
| 0.2 to 0.5 wt % | $K_2O$ |
| 0.5 to 1.2 wt % | CaO |
| 3.2 to 3.8 wt % | $ZrO_2$. |

Optionally, one or more of the constituents $SnO_2$, $CeO_2$, $P_2O_5$, and ZnO may be included, with a content of 0.5 wt % to 1.0 wt % in total.

According to a further preferred embodiment of the invention, the second glass sheet comprises the following composition, in mol %:

| | |
|---|---|
| 60 to 70 | $SiO_2$ |
| 10 to 13 | $Al_2O_3$ |
| 0.0 to 0.9 | $B_2O_3$ |
| 9.6 to 11.6 | $Li_2O$ |
| 8.2 to less than 10 | $Na_2O$ |
| 0.0 to 0.7 | $K_2O$ |
| 0.0 to 0.2 | MgO |
| 0.2 to 2.3 | CaO |
| 0.0 to 0.4 | ZnO |
| 1.3 to 2.6 | $ZrO_2$ |
| 0.0 to 0.5 | $P_2O_5$ |
| 0.003 to 0.100 | $Fe_2O_3$ |
| 0.0 to 0.3 | $SnO_2$ |
| 0.004 to 0.200 | $CeO_2$. |

Preferably, the following relationships apply for the composition of the lithium aluminum silicate glass:

$(Li_2O+Al_2O_3)/(Na_2O+K_2O)>2$ $0.47<Li_2O/(Li_2O+Na_2O+K_2O)<0.7$ $0.8<CaO+Fe_2O_3+ZnO+P_2O_5+B_2O_3+CeO_2<3$, wherein at least four of the six oxides are included in the glass composition.

Furthermore preferably, the lithium aluminum silicate glass has a glass transition temperature $T_g$ of less than 540° C. and/or a processing temperature of less than 1150° C.

According to a further embodiment of the invention, the second glass sheet exhibits a transmittance of more than 91.5% at 840 nm, a transmittance of more than 91.5% at a wavelength of 560 nm, and a transmittance of more than 90% at 380 nm.

According to yet another embodiment of the invention, the temperatures at which the glasses of the first and second glass sheets have the same viscosity values in the viscosity range between $10^7$ dPa·s and $10^{10}$ dPa·s only differ from each other by a maximum of 50° C., preferably by a maximum of 30° C., more preferably by a maximum of 20° C., and most preferably by a maximum of 10° C. at a respective identical viscosity.

Another aspect of the present invention relates to a method for producing a laminated glass pane. In this case, a first glass sheet and a second glass sheet are provided. The second glass sheet has a thickness between at least 0.3 mm and at most 1.5 mm and comprises a lithium aluminum silicate glass. The first glass sheet and the second glass sheet are bonded to one another by a polymeric layer with a thickness between at least 0.5 mm and at most 1.7 mm. The glasses of the first glass sheet and of the second glass sheet are matched such that the temperature at which the glasses of the first glass sheet and of the second glass sheet have the same viscosity in the viscosity range between $10^7$ dPa·s and $10^{10}$ dPa·s only differ from each other by a maximum of 50° C., preferably by a maximum of 30° C., more preferably by a maximum of 20° C., and most preferably by a maximum of 10° C.

According to a further embodiment of the method, the laminated glass pane has a curved shape, for example a uniaxially curved or biaxially curved shape.

According to a preferred embodiment of the method, the first glass sheet and the second glass sheet are bent in the same process step or in succession with the same process parameters.

According to a further embodiment of the invention, the second glass sheet is provided in toughened, in particular chemically toughened form.

According to yet another embodiment of the invention, the first glass sheet is provided in toughened, in particular chemically toughened form.

DETAILED DESCRIPTION

Figure 1:
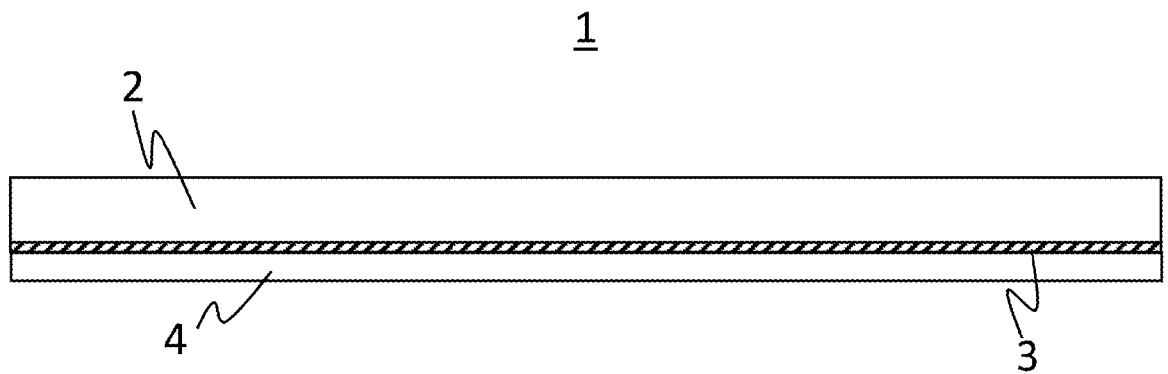
FIGS. 1 and 2 each show views of a laminated glass pane according to embodiments of the invention.

FIG. 1 is a schematic view, not drawn to scale, of a laminated glass pane 1 comprising a first glass sheet 2, a polymeric layer 3 disposed between and bonding the first glass sheet 2 to the second glass sheet 4, and finally the second glass sheet 4.

More generally, however, without being limited to the exemplary embodiment illustrated here, it is also possible for the laminated glass pane to comprise more than two glass sheets. For example, this may be the case when particularly high mechanical loads are expected and, accordingly, a particularly high strength of the laminated glass pane is desired.

The polymeric layer 3 has a thickness between at least 0.5 mm and at most 1.7 mm. It may be provided in the form of a film, for example a film comprising EVA and/or polyvinyl butyral, or in the form of a layer comprising a plurality of films, or a multilayer film. But it is also possible to form the polymeric layer in situ, by applying monomers to one of the two glass sheets 2, 4 and starting a polymerization reaction. Generally, it is also possible to form the polymeric layer 3 from laminated films. In particular, the films may also comprise PET and/or PE. In the case of a multilayer film, the layers may have different compositions and physical properties. Generally, the film or a layer of a multilayer film may have a low-E coating or a so-called solar control coating.

Furthermore, in the illustrated embodiment, the first glass sheet 2 has a greater thickness than the second glass sheet 4. This is advantageous, for example, if the first glass sheet has a lower intrinsic strength than the glass sheet 4, and so the thickness of the first glass sheet 2 is increased accordingly to ensure a sufficient strength of the laminated glass pane 1 as a whole.

The second glass sheet 4 has a thickness between at least 0.3 mm and at most 1.5 mm.

The glasses of the first and second glass sheets 2, 4 are matched to one another such that the temperatures at which the two glasses of the first and second glass sheets have the same viscosity in the viscosity range between $10^7$ dPa·s and $10^{10}$ dPa·s only differ from each other by not more than of 50° C., preferably by not more than 30° C., more preferably by not more than 20° C., and most preferably by not more than 10° C.

According to a further embodiment of the invention, the lithium aluminum silicate glass has a Young's modulus of at least 80 GPa, preferably at least 82 GPa, more preferably at least 84 GPa.

Preferably, the second glass sheet 4 is provided in the form of a chemically toughened glass sheet, preferably as a chemically toughened glass sheet with a compressive stress zone of at least 40 μm thickness, the compressive stress being at least 150 MPa and at most 900 MPa.

According to a further embodiment of the invention, the compressive stress is at most 800 MPa, preferably at most 600 MPa. Such compressive stress is achieved in particular by toughening using a sodium nitrate-potassium nitrate mixture.

According to a further embodiment of the invention, the compressive stress is at most 500 MPa, preferably at most 400 MPa, more preferably at most 300 MPa, and most preferably at most 250 MPa. Such compressive stresses can be achieved in particular by toughening using a pure sodium nitrate melt.

Here, the nature of the respective toughening process can usually be identified based on a variation in the composition of the considered glass, i.e. of the glass sheet in question, for example, namely on the surface of the glass, i.e. the glass sheet, for example. If the toughening is accomplished by immersion into a sodium salt melt, such as a sodium nitrate melt, sodium will be enriched in the surface of the glass, whereas the surface layer will be depleted of lithium which has been exchanged by sodium. This depletion and enrichment can be revealed by ToF-SIMS surface profiles, for example.

If the toughening is performed in a salt melt which comprises a mixture of potassium and sodium salts, then the surface of the glass will in particular become enriched in potassium, which can also be detected by ToF-SIMS. Furthermore, a depletion in lithium will occur.

According to a further embodiment of the invention, the compressive stress zone has a depth of at least 50 μm, preferably of at least 60 μm, more preferably of at least 70 μm, and most preferably of at least 80 μm. Such a thickness of the compressive stress zone or ion exchange zone is preferably obtained by exchanging sodium for lithium.

According to a further embodiment of the invention, the second glass sheet 4 is configured such that the compressive stress zone has a depth of at least 40 μm thickness, preferably at least 50 μm thickness, more preferably at least 60 μm thickness, yet more preferably at least 70 μm thickness, and most preferably at least 80 μm thickness, and, preferably, the surfaces of the second glass sheet 4 are enriched in sodium and depleted of lithium in the region of the compressive stress zone (or ion exchange zone) compared to the bulk of glass sheet 4. Such a configuration of the glass sheet 4 can be achieved, for example, by an exchange in which the salt bath (the molten salt) comprises sodium nitrate and in particular solely consists of sodium nitrate, so that the compressive stress zone (or ion exchange zone) is obtained by replacing lithium by sodium.

According to one embodiment of the invention, the laminated glass pane 1 is provided in the form of a curved laminated glass pane such that the outwardly facing side of the second glass sheet 2 is curved concavely.

Preferably, the second glass sheet 4 is formed in a melting process followed by a hot forming process. The hot forming process comprises, for example, a drawing process, such as an up-draw process, a down-draw process, or an overflow fusion process, or a float process. It has been found that the aforementioned processes allow to obtain particularly smooth and even surfaces of the glass sheets produced in this way. This, in turn, is advantageous for a correspondingly good view through the laminated glass pane 1 and also for good mechanical strength values both for the laminated glass pane 1 and for the glass sheet produced in this way, here the glass sheet 4, by way of example. Particularly preferably, the second glass sheet 4 is a float glass.

According to a further embodiment of the invention, the second glass sheet 4 has a zebra angle greater than or equal to 45°, in particular greater than or equal to 50°, more preferably greater than or equal to 55°, at a thickness of 0.7 mm.

According to a further embodiment of the invention, the second glass sheet 4 has a ring-on-ring bending strength of more than 150 MPa, in particular more than 250 MPa, preferably more than 300 MPa, yet more preferably more than 400 MPa, yet more preferably more than 500 MPa, and most preferably more than 600 MPa, and of less than 900 MPa.

In a particularly preferred embodiment of the laminated glass pane 1, the second glass sheet 4 has a combined toughened zone which comprises a potassium-exchanged surface layer with a thickness of less than 20 μm as determined from the glass surface, with a maximum compressive stress at the surface of more than 500 MPa, preferably more than 600 MPa; and a sodium-exchanged surface layer with a thickness of more than 40 μm, preferably more than 50 μm, more preferably more than 60 μm, yet more preferably more than 70 μm, and most preferably more than 80 μm as determined from the glass surface, wherein the maximum local stress in the interior of the purely sodium-exchanged surface layer is less than 500 MPa, preferably less than 400 MPa.

The maximum stress in the potassium-exchanged surface layer is at most 900 MPa. The maximum stress in the sodium-exchanged surface layer may be at least 50 MPa.

This means that in the surface layer of the second glass sheet 4, i.e. to a thickness of less than 20 μm (so-called potassium exchange zone), potassium ions have been exchanged for sodium ions and for lithium ions to a lesser extent. Furthermore, the glass sheet 4 has a sodium-exchanged surface layer (so-called sodium exchange zone), which may at least partially overlap with the potassium-exchanged surface in terms of its extent in the glass. This sodium-exchanged surface layer has a thickness of more than 40 μm, in particular more than 50 μm, preferably more than 60 μm, more preferably more than 70 μm, and most preferably more than 80 μm. Here, the alkali ions such as lithium ions have been replaced by sodium ions, at least partially.

According to a further embodiment of the invention, the first glass sheet 2 comprises a soda-lime glass with a thickness between 1.5 mm and 2.5 mm or a lithium aluminum silicate glass with a thickness between at least 0.3 mm and at most 1.5 mm. By way of example, and without being limited to the exemplary embodiment illustrated in FIG. 1, it is therefore also possible for the first and second glass sheets 2, 4 to have the same thickness.

According to a preferred embodiment of the invention, the second glass sheet comprises a lithium aluminum silicate glass having a $Li_2O$ content from 4.6 wt % to 5.4 wt % and an $Na_2O$ content from 8.1 wt %. to 9.7 wt % and an $Al_2O_3$ content from 16 wt % to 20 wt %.

According to yet another embodiment of the invention, the second glass sheet 4 comprises the following constituents:

| | |
|---|---|
| 58 to 65 wt % | $SiO_2$ |
| 16 to 20 wt % | $Al_2O_3$ |
| 0.1 to 1 wt % | $B_2O_3$ |
| 4.6 to 5.4 wt % | $Li_2O$ |
| 8.1 to 9.7 wt % | $Na_2O$ |
| optionally 0.05 to 1.0 wt % | $K_2O$ |
| 0.2 to 2.0 wt % | CaO |
| 2.5 to 5.0 wt % | $ZrO_2$. |

Optionally, one or more of the constituents $SnO_2$, $CeO_2$, $P_2O_5$, and ZnO may be included, with a content of 0 wt % to 2.5 wt % in total.

Preferably, in this case, the second glass sheet 4 comprises the following constituents:

| | |
|---|---|
| 60 to 62 wt % | $SiO_2$ |
| 17.5 to 19.5 wt % | $Al_2O_3$ |
| 0.5 to 0.7 wt % | $B_2O_3$ |
| 4.8 to 5.2 wt % | $Li_2O$ |
| 8.5 to 9.5 wt % | $Na_2O$ |
| 0.2 to 0.5 wt % | $K_2O$ |
| 0.5 to 1.2 wt % | CaO |
| 3.2 to 3.8 wt % | $ZrO_2$. |

Optionally, one or more of the constituents $SnO_2$, $CeO_2$, $P_2O_5$, and ZnO may be included, with a content of 0.25 wt % to 1.6 wt % in total.

Furthermore preferably, the second glass sheet 4 comprises the following constituents:

| | |
|---|---|
| 61 to 62 wt % | $SiO_2$ |
| 17.5 to 18.5 wt % | $Al_2O_3$ |
| 0.5 to 0.7 wt % | $B_2O_3$ |
| 4.9 to 5.1 wt % | $Li_2O$ |
| 8.8 to 9.3 wt % | $Na_2O$ |
| 0.2 to 0.5 wt % | $K_2O$ |
| 0.5 to 1.2 wt % | CaO |
| 3.2 to 3.8 wt % | $ZrO_2$. |

Optionally, one or more of the constituents $SnO_2$, $CeO_2$, $P_2O_5$, and ZnO may be included, with a content of 0.5 wt % to 1.0 wt % in total.

According to a further preferred embodiment of the invention, the second glass sheet 4 comprises the following composition, in mol %:

| | |
|---|---|
| 60 to 70 | $SiO_2$ |
| 10 to 13 | $Al_2O_3$ |
| 0.0 to 0.9 | $B_2O_3$ |

-continued

| | |
|---|---|
| 9.6 to 11.6 | Li$_2$O |
| 8.2 to less than 10 | Na$_2$O |
| 0.0 to 0.7 | K$_2$O |
| 0.0 to 0.2 | MgO |
| 0.2 to 2.3 | CaO |
| 0.0 to 0.4 | ZnO |
| 1.3 to 2.6 | ZrO$_2$ |
| 0.0 to 0.5 | P$_2$O$_5$ |
| 0.003 to 0.100 | Fe$_2$O$_3$ |
| 0.0 to 0.3 | SnO$_2$ |
| 0.004 to 0.200 | CeO$_2$. |

Preferably, the following relationships apply for the composition of the lithium aluminum silicate glass:

$(Li_2O+Al_2O_3)/(Na_2O+K_2O)>2$ $0.47<Li_2O/(Li_2O+Na_2O+K_2O)<0.7$ $0.8<CaO+Fe_2O_3+ZnO+P_2O_5+B_2O_3+CeO_2<3$, wherein at least four of the six oxides are included in the glass composition.

Furthermore preferably, the lithium aluminum silicate glass has a glass transition temperature $T_g$ of less than 540° C. and/or a processing temperature of less than 1150° C.

Furthermore, according to another embodiment, the laminated glass pane 1 is configured such that the second glass sheet 4, at a thickness of 0.7 mm, exhibits a transmittance of more than 91.5% at a wavelength of 840 nm, of more than 91.5% at a wavelength of 560 nm, and of more than 90% at 380 nm. As already mentioned above, this is particularly advantageous for achieving of a good view through the pane 1, so that passenger safety is further improved in this way.

Preferably, the laminated glass pane 1 is designed such that the temperatures at which the glasses of the first glass sheet 2 and of the second glass sheet 4 have the same viscosity in the viscosity range between $10^7$ dPa·s and $10^{10}$ dPa·s only differ from each other by a maximum of 50° C., preferably by a maximum of 30° C., more preferably by a maximum of 20° C., and most preferably by a maximum of 10° C. at a respective identical viscosity.

According to yet another embodiment of the invention, the second glass sheet 4 is provided in a chemically toughened form, substantially by an exchange of lithium ions by sodium ions. A glass sheet is referred to as being "toughened substantially by an exchange of lithium ions by sodium ions", if the substantial portion of preliminary stress, i.e. at least 80% of the generated preliminary stress, is caused by the exchange of lithium ions by sodium ions. A glass sheet is in particular toughened substantially by an exchange of lithium ions by sodium ions if the preliminary stress is exclusively achieved by this exchange.

Another aspect of the present invention relates to a method for producing a laminated glass pane 1. In this case, a first glass sheet 2 and a second glass sheet 4 are provided. The second glass sheet has a thickness between at least 0.3 mm and at most 1.5 mm and comprises a lithium aluminum silicate glass. The first glass sheet 2 and the second glass sheet 4 are bound to one another by a polymeric layer 3 with a thickness between at least 0.5 mm and at most 1.7 mm. The glasses of the first glass sheet 2 and of the second glass sheet 4 are matched such that the temperature at which the glasses of the first glass sheet 2 and of the second glass sheet 4 have the same viscosity in the viscosity range between $10^7$ dPa·s and $10^{10}$ dPa·s only differ from each other by a maximum of 50° C., preferably by a maximum of 30° C., more preferably by a maximum of 20° C., and most preferably by a maximum of 10° C.

According to a further embodiment of the method, the laminated glass pane 1 is curved, for example uniaxially curved or biaxially curved. In the context of the present invention, a glass sheet is referred to as being uniaxially curved when the glass sheet is curved in only one direction. A glass sheet is referred to as being biaxially curved when the glass sheet is curved in two directions, for example in the form of a shell or a dome-like shape.

According to a preferred embodiment of the method, the first glass sheet 1 and the second glass sheet 4 are bent in the same process step or in succession using the same process parameters.

Figure 2:
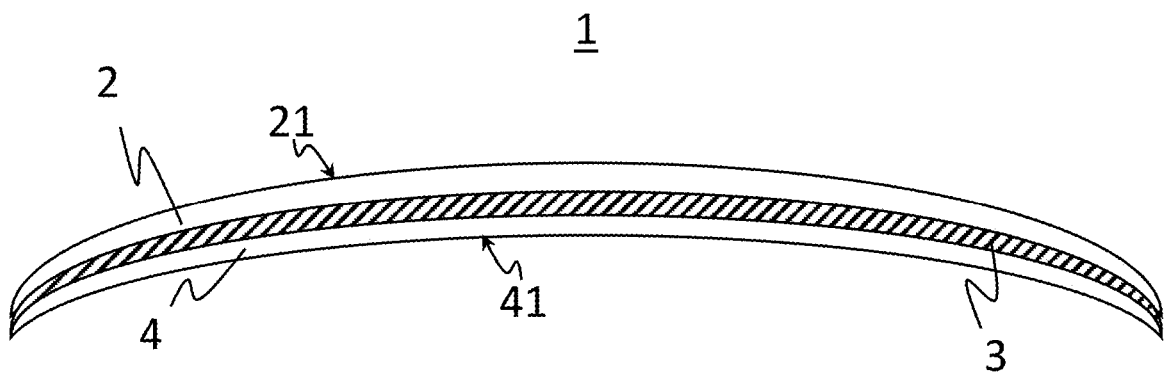

FIG. 2 shows a further embodiment of a laminated glass pane 1. Here, again, the laminated glass pane 1 comprises a first glass sheet 2, a polymeric layer 3, and a second glass sheet 4. However, this time the laminated glass pane 1 has a curved shape. It is possible in this case, that the thickness of the individual glass sheets 2, 4 and of the polymeric layer 3 decreases from the center of the laminated glass pane 1 towards the edges thereof, as illustrated. However, it is also possible that the thickness of the individual glass sheets 2, 4 and also that of the polymeric layer 3 is consistent, or that only individual ones of the layers 2, 3, 4 constituting the laminated glass pane 1 have a thickness that varies over the cross section of the pane 1. For example, one or more of the layers may be wedge-shaped.

In the present case, the laminated glass pane 1 is formed such that the outwardly facing surface 41 of the second glass sheet 4 is curved concavely.

More generally, without being limited to the example illustrated here, the laminated glass pane 1 may also be designed such that the outwardly facing surface 21 of the first glass sheet 2 is curved concavely.

Figure 3:
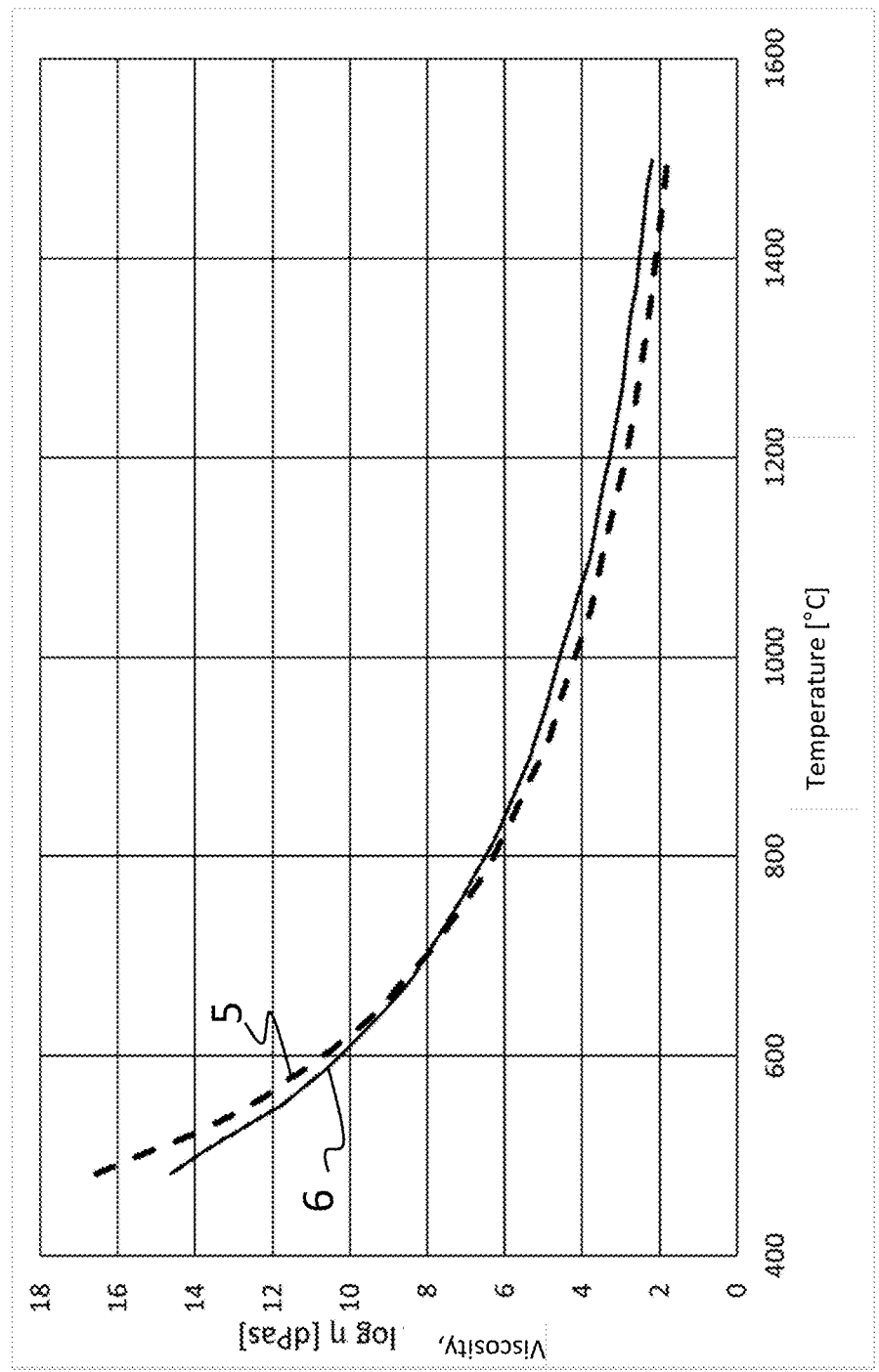
FIG. 3 shows the viscosity versus temperature profile for two different glasses.

FIG. 3 shows the viscosity curve for two different glasses 5 and 6. The y-axis represents the decadic logarithm of the viscosity, in dPa·s, and the x-axis represents the temperature, in ° C. In the viscosity range between $10^7$ and $10^{10}$ dPa·s, which is of particular relevance for producing a laminated glass pane according to embodiments of the invention, the viscosity curves of the two glasses 5 and 6 are very close to one another. In the case of the glasses selected here by way of example, glass 5 is a so-called soda-lime glass, glass 6 is a lithium aluminum silicate glass.

Figure 4A:
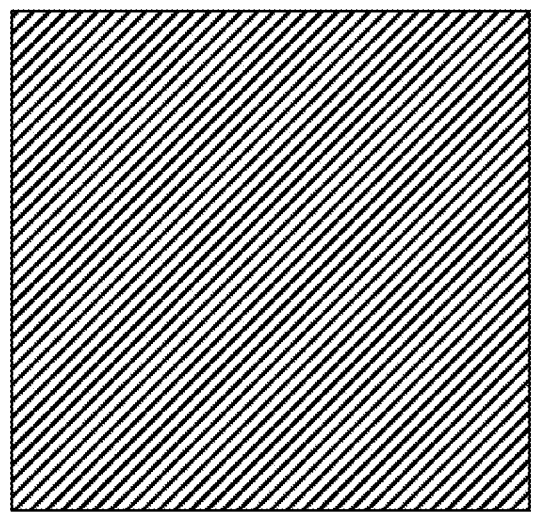
FIGS. 4a and 4b show two schematic views of the imaging of stripe images when viewed through a glass sheet.

FIG. 4a is a schematic view of a so-called 'zebra board' when viewed through the glass sheet 4 (not shown here), and in this case the angle between the glass sheet 4 and the zebra board is 0°, i.e. the glass sheet and the board are arranged parallel to each other and the viewing direction is perpendicular through the glass sheet.

More generally, without being limited to the view of such a striped board illustrated here, different embodiments of such a zebra board are possible. For example, the stripes may extend in parallel to the diagonal of the zebra board, as exemplified herein. However, other embodiments are also possible. In particular boards are available in which the stripes define an angle of 30° with one of the edges bounding the board, for example.

In such an arrangement in which the glass sheet 4 and the stripe board or zebra board are arranged parallel to each other, as is the case in FIG. 4a, the image will usually not be distorted at all.

Figure 4B:
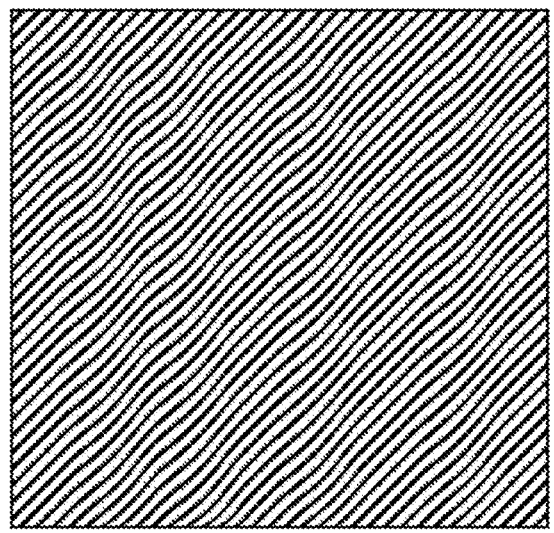

The situation is different when an angle is created between the glass sheet 4 and the board. Depending on the quality of the glass sheet, i.e. in particular depending on how strongly thickness variations are pronounced in the glass sheet, this effect will appear stronger or weaker. Therefore, a measure of the quality of the glass sheet is the maximum angle at which no distortion is perceived any more. FIG. 4b illustrates a distortion of the stripe image, by way of example.

LIST OF REFERENCE NUMERALS

1 Laminated glass
2 First glass sheet
21 Outwardly facing surface of glass sheet 2
3 Polymeric layer
4 Second glass sheet
41 Outwardly facing surface of glass sheet 4

What is claimed is:

1. A laminated glass pane, comprising:
a first glass sheet having a first composition;
a second glass sheet having a thickness between at least 0.3 mm and at most 1.5 mm, the second glass sheet being made of a lithium aluminum silicate glass and having a second composition that differs from the first composition; and
a polymeric layer having a thickness between at least 0.5 mm and at most 1.7 mm, the polymeric layer positioned between and bonding the first and second glass sheets to one another,
wherein the first and second compositions are, in a viscosity range between $10^7$ dPa·s and $10^{10}$ dPa·s, matched so that temperatures at which the first and second glass sheets have a same viscosity only differ from each other by not more than 50° C.; and
wherein the second glass sheet comprises a lithium aluminum silicate glass having:
a $Li_2O$ content from 4.6 wt % to 5.4 wt %;
a $Na_2O$ content from 8.1 wt % to 9.7 wt %;
a $Al_2O_3$ content from 16 wt % to 20 wt %; and
a $B_2O_3$ content from 0 wt % to 0.9 wt %.

2. The laminated glass pane of claim 1, wherein the temperatures differ by not more than 10° C.

3. The laminated glass pane of claim 1, wherein the lithium aluminum silicate glass exhibits a Young's modulus of at least 80 GPa.

4. The laminated glass pane of claim 3, wherein the Young's modulus is at least 84 GPa.

5. The laminated glass pane of claim 1, wherein the second glass sheet is a chemically toughened glass sheet having a compressive stress zone with a depth of at least 40 μm and a compressive stress of at least 150 MPa and at most 900 MPa.

6. The laminated glass pane of claim 1, wherein the second glass sheet is a chemically toughened glass sheet having a compressive stress zone with a depth of at least 40 μm and a compressive stress of at least 150 MPa and at most 600 MPa.

7. The laminated glass pane of claim 5, wherein the depth is at least 80 μm.

8. The laminated glass pane of claim 5, wherein the second glass sheet comprises surfaces that are enriched in sodium and depleted of lithium in a region of the compressive stress zone compared to a bulk of the second glass sheet.

9. The laminated glass pane of claim 1, further comprising a curvature such that an outwardly facing side of the second glass sheet is curved concavely.

10. The laminated glass pane of claim 1, further comprising a uniaxial curve or a biaxial curve.

11. The laminated glass pane of claim 10, wherein one or more of the first glass sheet, the second glass sheet, and the polymeric layer have a thickness that decreases from a center of curvature towards edges of the laminated glass pane.

12. The laminated glass pane of claim 10, wherein one or more of the first glass sheet, the second glass sheet, and the polymeric layer have a thickness that remains consistent from a center of curvature towards edges of the laminated glass pane.

13. The laminated glass pane of claim 1, wherein the second glass sheet is a float glass sheet.

14. The laminated glass pane of claim 1, wherein the second glass sheet has a zebra angle of greater than or equal to 45° at a thickness of 0.7 mm.

15. The laminated glass pane of claim 1, wherein the second glass sheet has a zebra angle of greater than or equal to 55° at a thickness of 0.7 mm.

16. The laminated glass pane of claim 1, wherein the second glass sheet exhibits a ring-on-ring bending strength of more than 150 MPa and of less than 900 MPa.

17. The laminated glass pane of claim 1, wherein the second glass sheet exhibits a ring-on-ring bending strength of more than 600 MPa and of less than 900 MPa.

18. The laminated glass pane of claim 1, wherein the second glass sheet comprises a combined toughened zone comprising:
a potassium-exchanged surface layer with a thickness of less than 20 μm as determined from a surface of the second glass sheet and a maximum compressive stress at the surface of more than 500 MPa; and
a sodium-exchanged surface layer with a thickness of more than 40 μm as determined from the surface, wherein the sodium-exchanged surface layer has a maximum local stress in an interior of a purely sodium-exchanged region that is less than 500 MPa.

19. The laminated glass pane of claim 1, wherein the first glass sheet comprises a soda-lime glass with a thickness between 1.5 mm and 2.5 mm or a lithium aluminum silicate glass with a thickness between at least 0.3 mm and at most 1.5 mm.

20. The laminated glass pane of claim 1, wherein the second glass sheet is a substantially chemically toughened glass sheet due to an exchange of lithium ions by sodium ions.

21. A laminated glass pane, comprising:
a first glass sheet being made of soda-lime glass;
a second glass sheet having a thickness between at least 0.3 mm and at most 1.5 mm, the second glass sheet being made of a lithium aluminum silicate glass; and
a polymeric layer having a thickness between at least 0.5 mm and at most 1.7 mm, the polymeric layer positioned between and bonding the first and second glass sheets to one another,
wherein the first and second glass sheets comprise glass compositions that, in a viscosity range between $10^7$ dPa·s and $10^{10}$ dPa·s, are matched so that temperatures at which the first and second glass sheets have a same viscosity only differ from each other by not more than 50° C.

* * * * *